UNITED STATES PATENT OFFICE.

EDUARD MÜNCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF GERMANY.

PROCESS OF MAKING THIOINDIGO LEUCO COMPOUNDS.

No. 910,839.　　　　Specification of Letters Patent.　　　Patented Jan. 26, 1909.

Application filed September 1, 1908. Serial No. 451,252.

*To all whom it may concern:*

Be it known that I, EDUARD MÜNCH, doctor of philosophy and chemist, a subject of the Grand Duke of Baden, residing at Ludwigshafen-on-the-Rhine, Germany, have invented new and useful Improvements in Producing Leuco Compounds of Thioindigo Coloring-Matters, of which the following is a specification.

In the specification of the application for Letters Patent Serial No. 451250, filed Sep. 1 1908 I have described the production of omega-dihalogen-vinyl-thiosalicylic acid compounds by acting on certain thiosalicylic acid compounds with trihalogenethylene. I have discovered that these omega-dihalogen-vinyl-thiosalicylic acid compounds on treatment with an alkaline condensing agent can be made to yield leuco compounds of coloring matters of the thioindigo group. I can carry out the condensation of the omega-dihalogen-vinyl-thiosalicylic acid compounds for instance with caustic soda, caustic potash, mixtures thereof, and alcoholates of these metals. If desired, other agents may be used at the same time, for instance metallic carbonates, alkaline earth hydrates, diluting agents, and fluxes. The reaction may also be carried out under pressure. The condensation products thus obtained are leuco compounds of the so-called thioindigo coloring matters, for instance omega-dichlor-vinyl-thiosalicylic acid, when treated with an alkaline condensing agent, chiefly yields 3-oxy-(1)-thionapthene-2-carboxylic acid, or a mixture of this compound with 3-oxy-(1)-thionapthene.

The following examples will serve to illustrate further the nature of my invention and how it can be carried into practical effect, but it is not confined to these examples. The parts are by weight.

Example 1. Mix together four (4) parts of omega-dichlor-vinyl-thiosalicylic acid, four (4) parts of calcined soda and six (6) parts each of caustic soda and caustic potash, and then heat the mixture in an oil-bath to a temperature of from one hundred and twenty-five (125), to one hundred and fifty (150) degrees centigrade, whereupon reaction takes place and gas is evolved. Heat the resulting yellow melt for thirty (30) minutes at from two hundred (200), to two hundred and ten (210), degrees centigrade. Dissolve the melt, when cold, in water, add hydrochloric acid and filter off and dry the product from which 3-oxy-(1)-thionapthene carboxylic acid can be obtained in the pure form by extraction with benzene.

Example 2. Heat, in a metal bath at about two hundred (200) degrees centigrade, a mixture of four (4) parts of omega-dichlor-vinyl-thiosalicylic acid and four (4) parts each of caustic soda and caustic potash, whereupon reaction takes place and a yellow melt is obtained. Continue heating for thirty (30) minutes, dissolve in water, and acidulate with hydrochloric acid. Upon distillation with steam 3-oxy-(1)-thionapthene passes over and separates in the form of fine needles.

Example 3. Introduce five (5) parts of omega-dichlor-vinyl-thiosalicylic acid into a boiling solution of sodium alcoholate, prepared from ten (10) parts of sodium. Distil off the alcohol, gradually raising the temperature to from two hundred and ten (210), to two hundred and thirty (230), degrees centigrade, and heat till a yellow melt is obtained, from which the leuco compound can be obtained in the manner described in the foregoing Example 2.

Example 4. Heat in an oil-bath, at from one hundred and fifty (150), to one hundred and seventy-five (175), degrees centigrade, a mixture of equal parts of omega-dichlor-vinyl-para-brom-thiosalicylic acid, calcined soda, caustic soda and caustic potash, whereupon reaction soon takes place and a brown-yellow melt is obtained. Dissolve the cold melt in water, and precipitate, by means of hydrochloric acid, the resulting leuco compound of para-para-dibrom-thioindigo.

Now what I claim is:

1. The process of producing leuco compounds of coloring matters of the thioindigo group by acting with an alkaline condensing agent on an omega-dihalogen-vinyl-thiosalicylic acid compound.

2. The process of producing leuco compounds of coloring matters of the thioindigo group by acting with an alkaline condensing agent on omega dihalogen-vinyl-thiosalicylic acid.

3. The process of producing leuco compounds of coloring matters of the thioindigo group by acting with caustic soda, caustic potash and calcined soda on omega-dihalogen-vinyl-thiosalicylic acid.

In testimony whereof I have hereunto set my hand in the presence of two subscribing witnesses.

EDUARD MÜNCH.

Witnesses:
J. ALEC. LLOYD,
R. A. SIGSBEE.